(12) United States Patent
Delakowitz

(10) Patent No.: US 7,790,989 B2
(45) Date of Patent: Sep. 7, 2010

(54) DEVICE AND METHOD FOR UNIVERSALLY LEADING THROUGH CABLES

(75) Inventor: Bernd Delakowitz, Berlin (DE)

(73) Assignee: ADC GmbH, Berlin (DE)

( * ) Notice: Subject to any disclaimer, the term of this patent is extended or adjusted under 35 U.S.C. 154(b) by 390 days.

(21) Appl. No.: 11/911,063

(22) PCT Filed: Apr. 4, 2006

(86) PCT No.: PCT/EP2006/003046

§ 371 (c)(1),
(2), (4) Date: Oct. 9, 2007

(87) PCT Pub. No.: WO2006/108534

PCT Pub. Date: Oct. 19, 2006

(65) Prior Publication Data

US 2009/0218132 A1    Sep. 3, 2009

(30) Foreign Application Priority Data

Apr. 9, 2005    (DE) ........................ 10 2005 016 340

(51) Int. Cl.
*H02G 3/18* (2006.01)
(52) U.S. Cl. ................ 174/669; 174/11 BH; 174/31 R; 439/98
(58) Field of Classification Search ............ 174/11 BH, 174/31 R, 650, 669; 439/98, 736
See application file for complete search history.

(56) References Cited

U.S. PATENT DOCUMENTS

| | | | | |
|---|---|---|---|---|
| 4,198,537 A | * | 4/1980 | Mariani | ...................... 174/660 |
| 4,256,920 A | * | 3/1981 | Ayres et al. | .................. 174/667 |
| 4,434,541 A | | 3/1984 | Powers, Jr. | |
| 6,359,224 B1 | * | 3/2002 | Beele | .......................... 174/665 |
| 6,674,012 B2 | * | 1/2004 | Beele | ..................... 174/140 R |

FOREIGN PATENT DOCUMENTS

| | | |
|---|---|---|
| DE | 6916274 | 2/1970 |
| DE | 31 47 931 | 6/1982 |
| DE | 197 01 959 | 8/1998 |
| DE | 198 25 672 | 12/1999 |
| DE | 699 08 312 | 2/2004 |
| EP | 1 113 555 | 7/2001 |
| EP | 1 489 713 | 12/2004 |
| FR | 1 307 295 | 9/1961 |
| FR | 1 538 622 | 6/1967 |
| FR | 2 689 331 | 10/1993 |
| FR | 2 657 472 | 12/2004 |
| JP | 11-260176 | 9/1999 |
| JP | 11-336953 | 12/1999 |

OTHER PUBLICATIONS

Certified Translation of FR2689331A1, 14 pages.

* cited by examiner

*Primary Examiner*—Dhiru R Patel
(74) *Attorney, Agent, or Firm*—Merchant & Gould P.C.

(57) ABSTRACT

An apparatus for universal cable bushing includes a cable bushing element which is designed to accommodate at least one cable made of at least one elastic base material. The cable bushing element has on its inner side a plurality of lamellae which are arranged in stepped fashion and of which at least one first lamella and one second lamella are each suitable for surrounding and fixing a cable to be passed through the cable bushing element. The cable bushing element has on its outer side a plurality of lamellae which are arranged in the form of a fir tree.

19 Claims, 7 Drawing Sheets

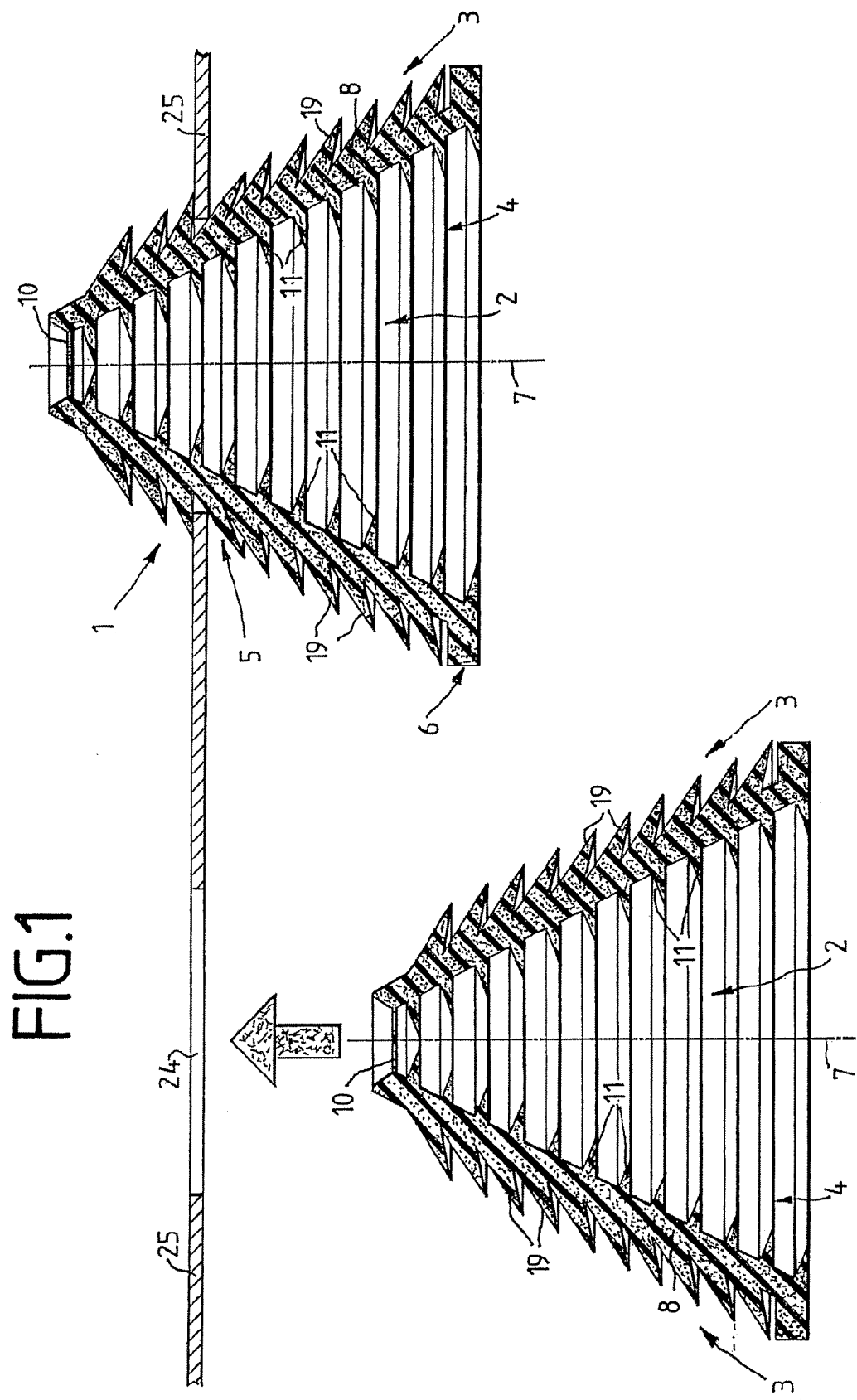

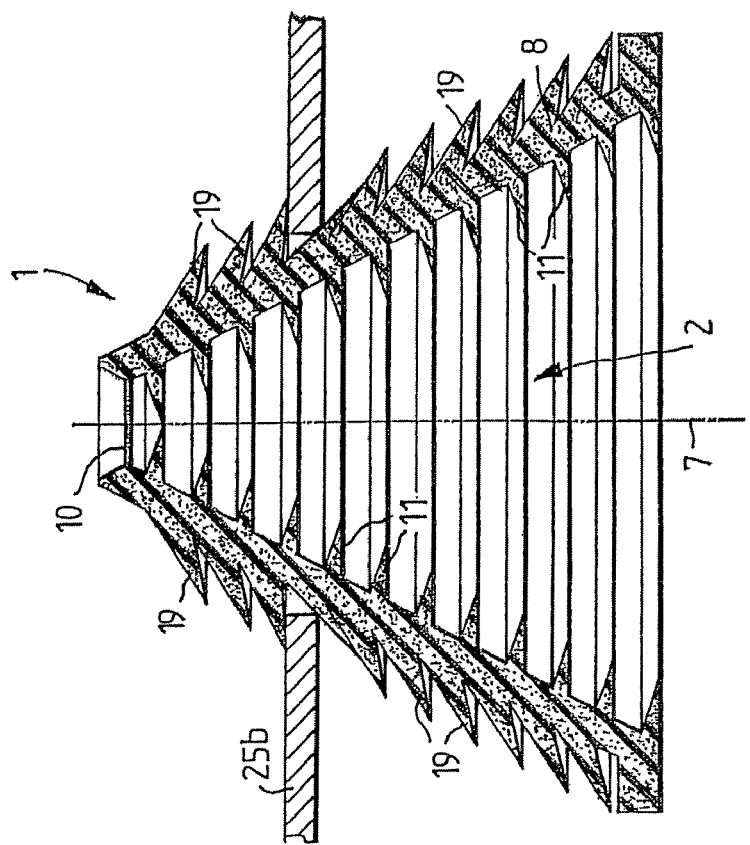

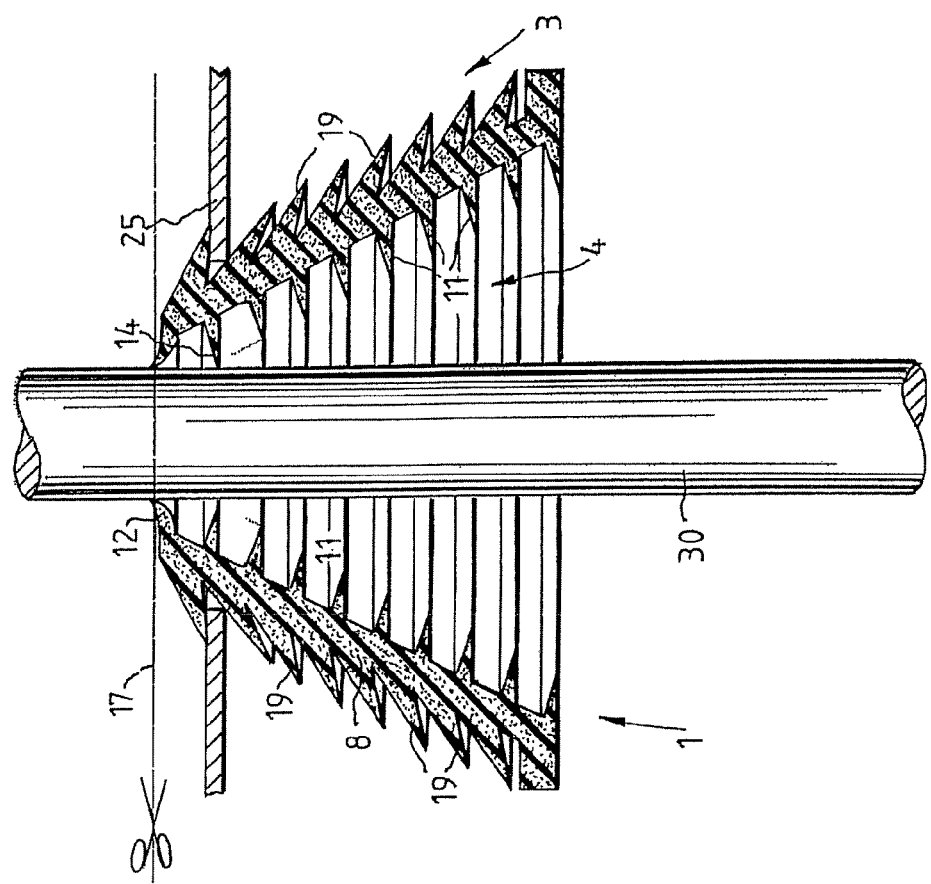
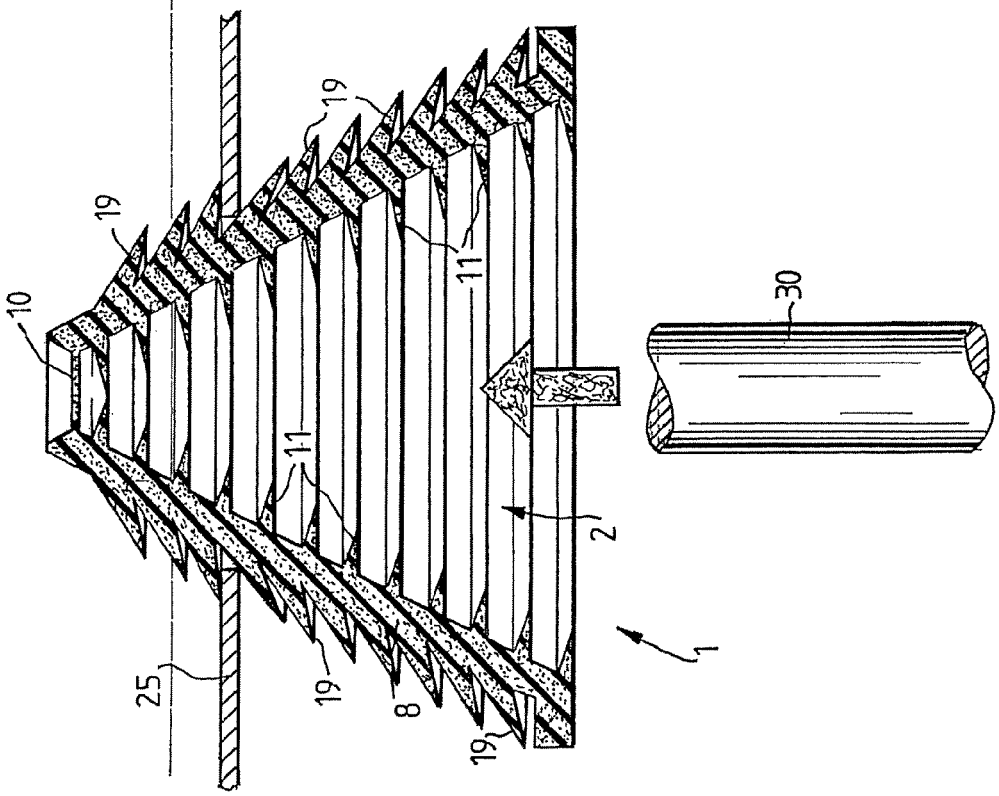

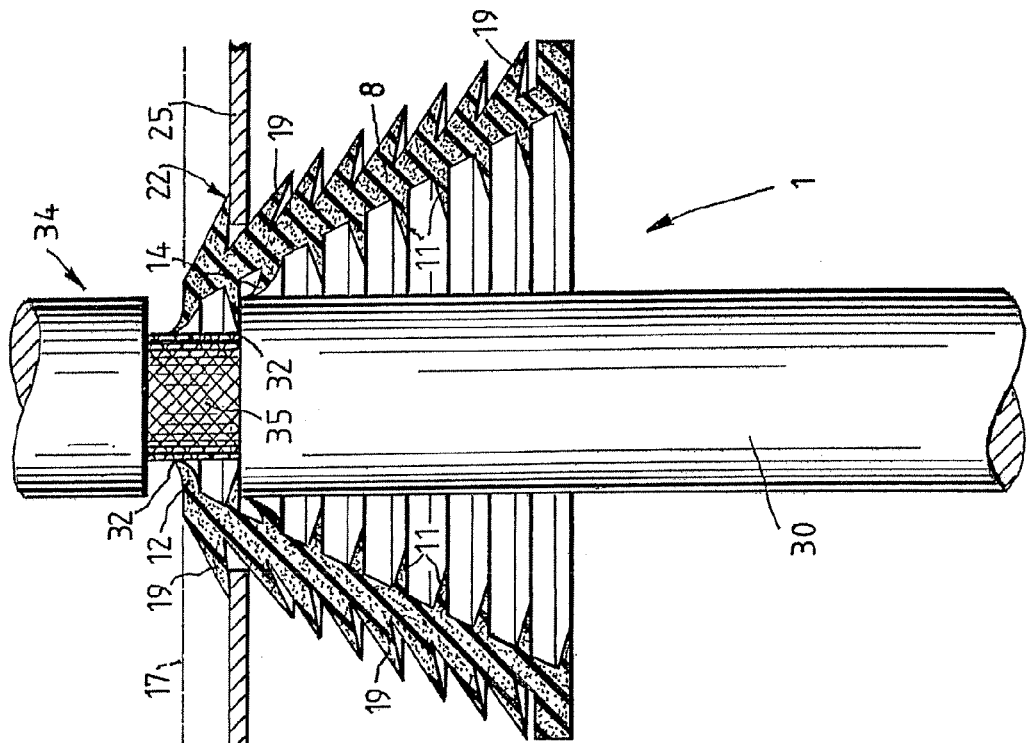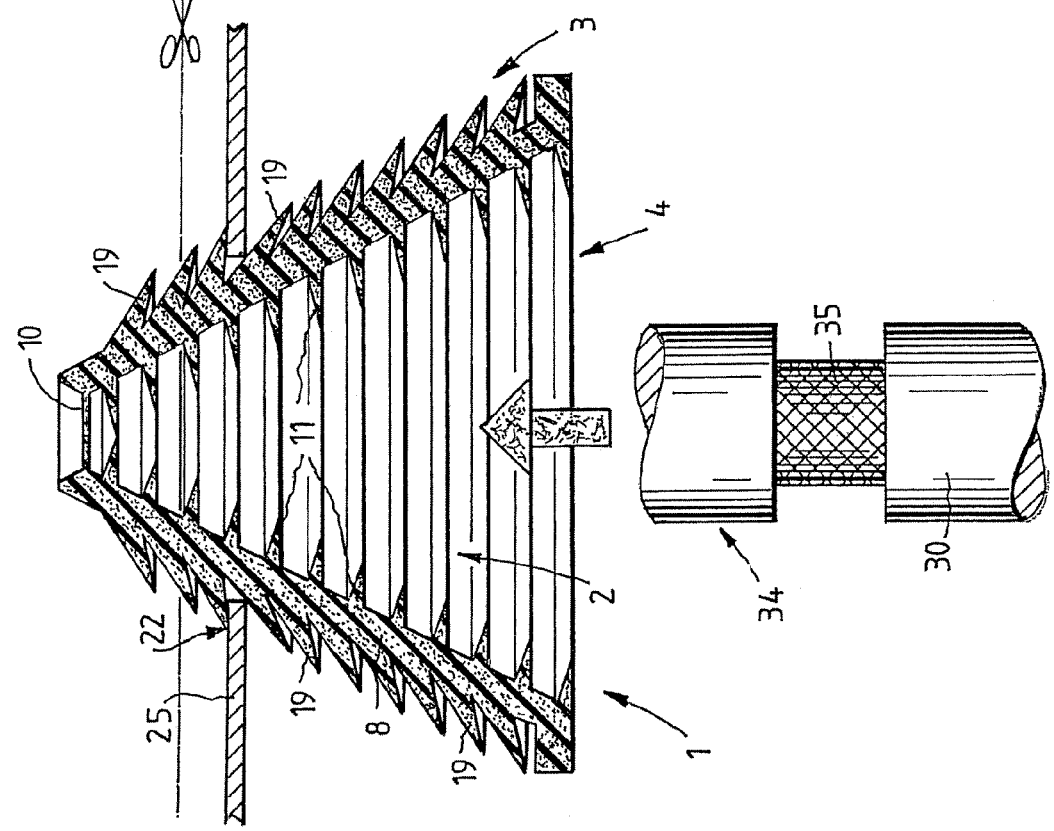

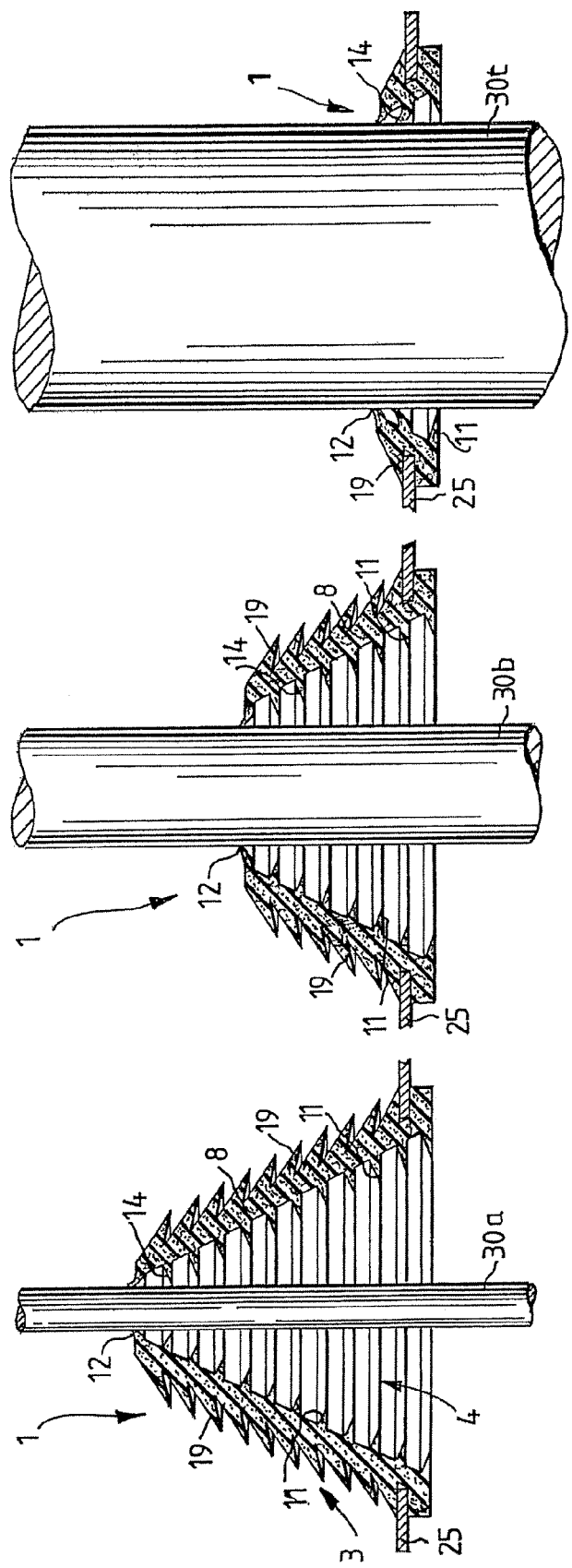

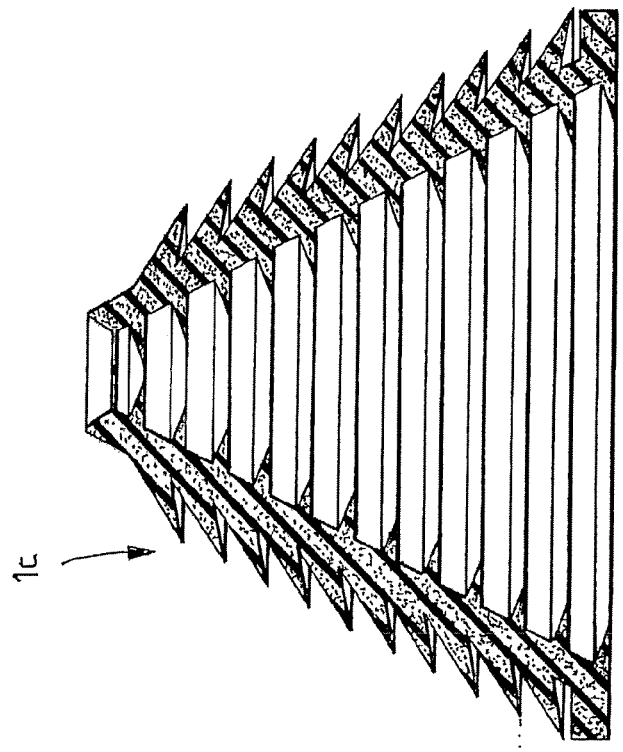
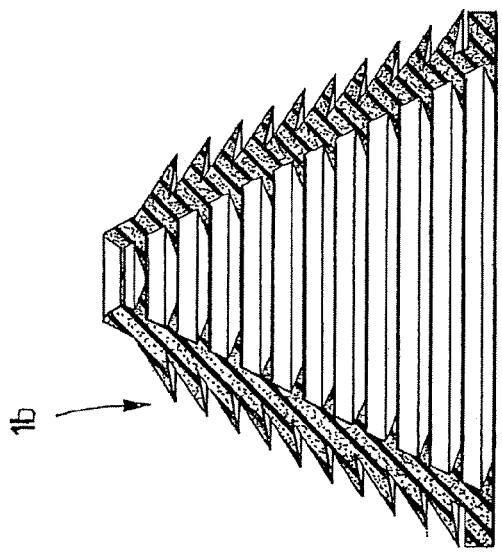
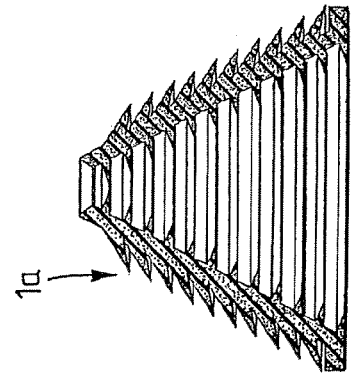

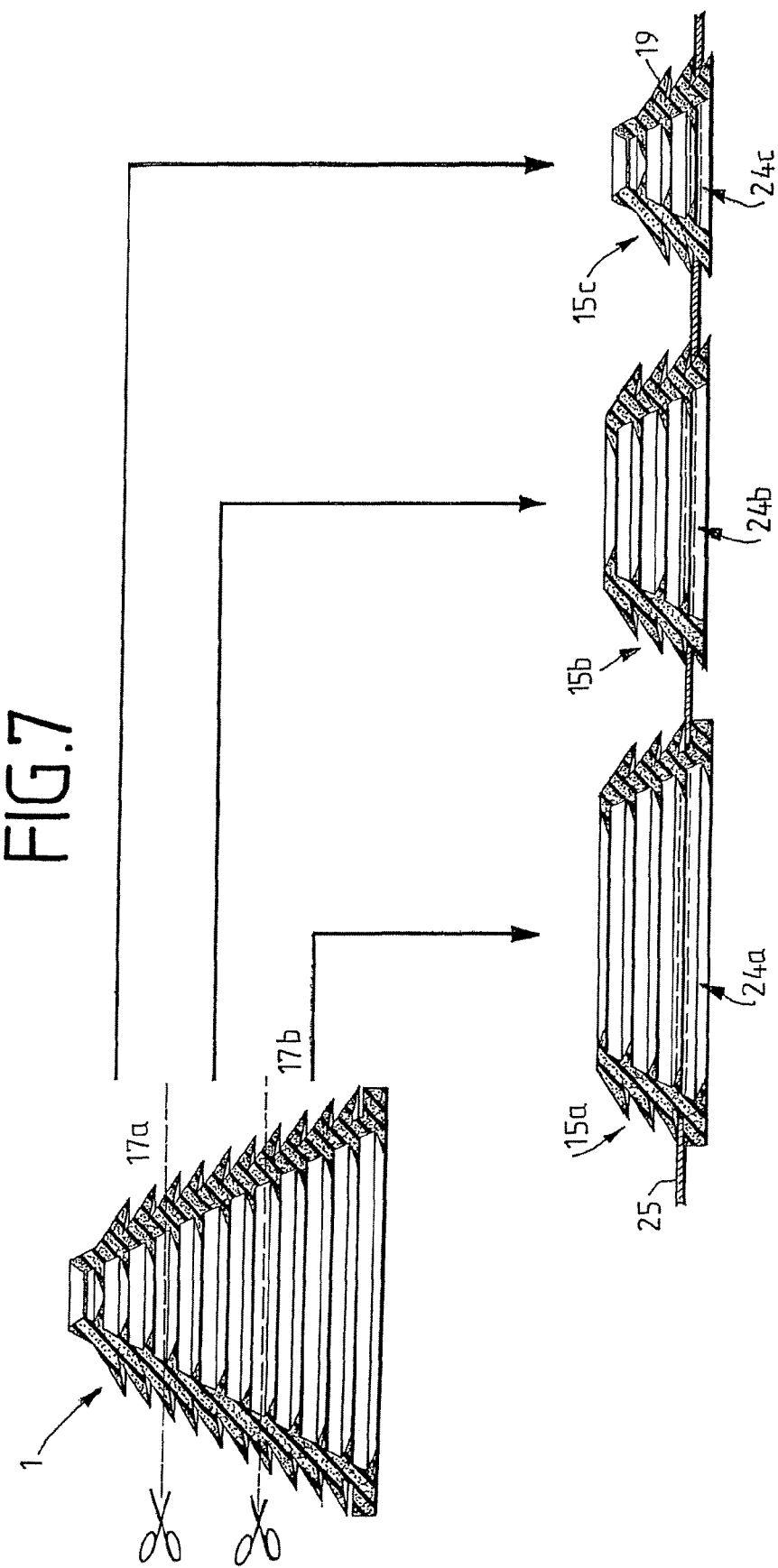

DEVICE AND METHOD FOR UNIVERSALLY LEADING THROUGH CABLES

BACKGROUND

Numerous methods and apparatuses for bushing cables using diverse installation materials or components, such as housing walls, are known which are suitable, depending on the type and size, only in each case for one cable type having a specific diameter or a narrow diameter range. Furthermore, the known cable bushings can generally only be used for an aperture in the installation material or component which is precisely matched to the geometry of the respective cable bushing apparatus.

Such an apparatus for cable bushing is already known, for example, from DE 19825672 A1. Therein, a cable bushing apparatus having a stopper made of an elastic material is disclosed, the stopper comprising a through-hole for accommodating a cable and a groove for introducing the stopper into a hole in a wall, and the cable bushing apparatus furthermore comprising a strain-relief unit, with an EMC-compliant cover being provided for the strain-relief unit. In this case at the same time, a shield designed as a wire mesh in the form of a truncated cone engages around a web-shaped limb of the strain-relief unit and a conical section of the stopper.

Significant disadvantages of such known apparatuses and methods for cable bushing consist in the fact that it is necessary always to have a large number of types available in terms of cable diameter, installation diameter and material thickness in order to be able to cover the entire range of the possible requirements. As a result, there is a relatively high degree of complexity as regards planning and logistics and increased costs owing to extensive storage both on the part of the manufacturer and on the part of the dealer and the consumer. In addition, a further disadvantage is that, as long as additional requirements are set as regards the electromagnetic compatibility (EMC) of a cable bushing, such as when guiding a cable out of a switchgear cabinet, in general the same types of one cable bushing cannot be manufactured or are not available at the same time with an EMC-compliant design as well.

SUMMARY

The invention is therefore based on the technical problem of providing an improved apparatus and an improved method for universal cable bushing.

The invention is in this case based on the knowledge that numerous disadvantages of the known apparatuses and methods for cable bushing can be avoided or reduced if a cable bushing element is used which can be used universally firstly for different cable diameter ranges and/or secondly for different installation diameter ranges and wall thicknesses. This is achieved according to the invention by an apparatus for universal cable bushing being proposed, comprising a cable bushing element which is designed to accommodate at least one cable made of at least one elastic base material and has on its inner side at least one sealing lip which is suitable for surrounding and fixing a cable to be passed through, the cable bushing element having on its inner side a plurality of more than two lamellae which are arranged in stepped fashion and of which at least one first lamella and one second lamella are each suitable for surrounding and fixing a cable to be passed through, and/or the cable bushing element having on its outer side a plurality of lamellae which are arranged in the form of a fir tree. A "stepped" arrangement of the lamellae on the inner side is in this case understood to mean that the lamellae are arranged one behind the other coaxially around the center axis of the cable bushing element, and the inner diameter of the lamellae tapers increasingly in the axial direction. The individual lamellae in this case preferably each have a triangular cross section and are each spaced apart from one another such that, together, they form an interrupted saw-tooth profile in the axial direction of the cable bushing element, said saw-tooth profile having spacings between the individual profile teeth which are each at least as wide as the tooth itself. An arrangement "in the form of a fir tree" of the lamellae on the outer side is in this case to be understood to mean that the lamellae are arranged one behind the other coaxially around the center axis of the cable bushing element, and the outer diameter of the lamellae tapers increasingly in the axial direction such that the outer profile of the cable bushing element is similar to the outline of a stylized fir tree. The individual lamellae in this case preferably each have a triangular cross section and together form a saw-tooth profile in the axial direction of the cable bushing element. Owing to the different diameters of the lamellae, which are arranged on the inner or outer side of the cable bushing element, it is possible to use a single cable bushing element according to the invention universally for a broad range of different cable diameters or installation hole diameters whilst ensuring all of the functionalities of a conventional diameter-specific cable bushing apparatus. In addition, the arrangement of the lamellae in the form of a fir tree on the outer side of the cable bushing element within a range which can be defined by the shape of the lamellae makes it possible to match the cable bushing element to different material thicknesses of an installation hole. In the ideal case, only one universal type of an apparatus for cable bushing according to the invention is sufficient to cover the conventional application areas as regards the cable and installation hole diameters and installation hole wall thickness. If the use of only one type can, however, not cover the broad range of the use envisaged, it is likewise conceivable for a plurality of a few universal apparatuses for cable bushing having different sizes to be provided which all have the same design and the same geometry and merely serve different diameter spectra. In addition, although the invention is preferably suitable for universally bushing cables, it is in the same way conceivable for such an apparatus according to the invention to also be used for universally bushing tubes or other components or functional elements having a longitudinal extent.

In one advantageous embodiment, the cable bushing element is of integral design. On the one hand, this makes manipulation easier during installation and, on the other hand, this increases the robustness of the cable bushing.

In a further advantageous embodiment, the cable bushing element is designed to be at least partially rotationally symmetrical. This increases the robustness of the cable bushing, favors the elastic deformation properties and makes it easier to manufacture and install the apparatus for cable bushing.

In a further advantageous embodiment, the cable bushing element is designed to be at least partially conical or in the form of a truncated cone. The cable bushing element is thus firstly suitable for accommodating different cable diameters and secondly for being matched to different installation diameters, for example in the hole in a housing wall. Although it is conceivable for only the cavity in the bushing on the inner side or only the outer contour of the cable bushing element in each case to be at least partially conical or in the form of a truncated cone, preferably both the cavity on the inner side and the outer contour of the cable bushing element are formed to be at least partially conical or in the form of a truncated cone, with the result that the cable bushing element then has an almost constant basic thickness of its wall (i.e. without taking into account the lamellae arranged on the inside and outside of the wall) at least in these regions which are conical or in the form of truncated cones. It is thus possible for the cable bushing element to be elastically deformed very easily and to be matched in an advantageous manner to the installation conditions.

In a further advantageous embodiment, the cable bushing element has at least one membrane which is closed in the initial state. Said membrane can then be passed through, for example only during installation of a cable to be passed through, with the aid of a screwdriver or else by means of the cable to be passed through itself. The membrane in this case serves the purpose of preventing the ingress of moisture or dirt into the cable bushing as long as no cable is passed through. In this way, using the cable bushing element which is initially still closed by the membrane, an "empty" cable bushing can be applied which has not yet been provided with a cable to be passed through but offers the possibilities for uncomplicated installation of such a cable bushing.

In one further advantageous embodiment, the length and the inner diameter range of the cable bushing element can be matched to the diameter of a cable to be passed through by separating off subregions which are not required. This is possible, in particular, owing to the fact that the cable bushing element is preferably manufactured from a material which is easy to cut, for example rubber or an elastic plastic. In this case, for example some of the cable bushing element which has a smaller inner diameter than the outer diameter of the cable to be passed through can then be separated off with the aid of a tool, for example a knife, to such an extent that at least one of the lamellae, which are arranged in stepped fashion on the inner side of the cable bushing element, having an inner diameter which corresponds to the cable to be passed through is still provided which in this case can tightly surround the cable for fixing and sealing purposes at its outer sleeve owing to its elastic properties. The region of the cable bushing element to be separated off is in this case longer and larger the thicker the cable to be passed through or the larger its diameter. The separated-off pieces can in this case be used further without any problems for other cable diameters or installation hole diameters, which reduces firstly costs and secondly waste and has less impact on the environment.

In a further advantageous embodiment, the length and the outer diameter range of the cable bushing element can be matched to the diameter of a hole into which the cable bushing element can be introduced for installation purposes by separating off subregions which are not required. For this purpose, the cable bushing element is preferably manufactured from a material which can be cut easily, for example rubber or an elastic plastic.

In this case, for example some of the cable bushing element which has a larger outer diameter than the installation hole for the cable bushing, for example in a housing wall, can then be separated off with the aid of a tool, for example a knife, to such an extent that at least one of the lamellae, which are arranged in the form of a fir tree on the outer side of the cable bushing element, having an outer diameter which corresponds to the diameter of the installation hole is still provided which in this case can come into engagement with the edge of the installation hole, so as to form a groove-shaped contour, for the purpose of fixing the cable bushing element in a final, installed position and for the purpose of sealing the cable bushing. Here too, the separated-off pieces can be used further without any problems for other installation hole diameters or cable diameters, which reduces costs and waste and has less impact on the environment.

In a further advantageous embodiment, the cable bushing element has electrically conductive properties. This affords the advantage that the cable bushing element, in addition to its elastic properties for accommodating and fixing a cable to be passed through, is thus also capable of serving as an EMC-proof shield itself without shielding elements additionally needing to be provided. "Electrically conductive" is in this context understood to mean that the relevant material has a volume resistance of at most 1 $\Omega$/cm, but preferably only 0.5 $\Omega$/cm and further preferably only 0.05 $\Omega$/cm and most preferably 0.005 $\Omega$/cm.

In a further advantageous embodiment, at least one electrically conductive additional material is introduced into the elastic base material, as a result of which the cable bushing element has electrically conductive properties. In order to provide the cable bushing element itself with such electrical conductivity, the elastic base material is preferably doped with particles of an electrically conductive additional material as a filler. However, it is also conceivable for it to be possible for a homogenous material to be produced from the primary substance of the elastic base material and the electrically conductive additional material, said homogenous material in this case itself having both elastic and electrically conductive properties. The elastic base material is preferably silicone or fluorosilicone or silicone rubber or a thermoplastic elastomer, furthermore preferably the silicone rubber type VMQ or an ethylene-propylene elastomer, for example EPDM-X-PP. The electrically conductive additional material is preferably silver-coated aluminum and/or silver-coated nickel and/or silver-coated copper and/or silver-coated glass and/or nickel graphite. In this case, for example, silver-coated aluminum has a particularly low volume resistance and thus a correspondingly high electrical shielding efficiency, whereas nickel graphite has a comparatively high volume resistance and thus a lower electrical shielding efficiency.

In a further advantageous embodiment, at least one of a plurality of lamellae, which are arranged in stepped fashion on the inner side of the cable bushing element, is suitable for making contact with a shield of the cable to be passed through. This may be achieved, for example, by the insulation of the cable being removed at the contact point between the cable to be passed through and the lamella, and the contact point then being exposed as far as the cable shield, with the result that the lamella engages fixedly around the exposed contact point owing to its elastic properties and is in contact with the cable shield. In this manner, for example, an electrical connection between the shield of the cable and a housing, in which the cable bushing is fitted, can be produced via the electrically conductive cable bushing element, as a result of which the shield of the cable is grounded. For this purpose, the cable bushing element may preferably be electrically and mechanically connected to a grounded contact area, for example a switchgear cabinet housing, in which the cable bushing is fitted, by means of the lamellae which are arranged in the form of a fir tree on the outer side of the cable bushing element. The contact area is preferably the edge of a hole in the wall of a housing, the edge of the hole in this case preferably being metallic. However, it is furthermore also conceivable for the shield of the cable itself to be already grounded in another manner and thus also for it to be possible for the apparatus for cable bushing to be grounded owing to the contact between the cable bushing element and the shield.

In a further advantageous embodiment, the cable bushing element has on its inner side at least one first lamella and one second lamella, which are arranged in stepped fashion and which are each suitable for surrounding and fixing a cable to be passed through, the first lamella additionally being suitable for making contact with a shield of the cable to be passed through. In this case, the first lamella, owing to its elastic properties, preferably engages around an exposed contact point of the cable to be passed through, at which the insulation of the cable is removed and which is then exposed as far as the cable shield, and is in contact with the cable shield. The second lamella, which is arranged in stepped fashion in relation to the first lamella and preferably has a slightly larger inner diameter than the first lamella, is then preferably in contact with the outer sleeve of the cable and surrounds the cable, owing to its elastic properties, tightly in order to fix it and for sealing purposes at its outer sleeve. In this case, at least the second, but preferably both the first and the second, lamella(e) serve(s) the purpose of preventing moisture and/or dirt from passing via the outer sleeve of the cable to be passed through from one side of the first and/or the second lamella to the other.

BRIEF DESCRIPTION OF THE DRAWINGS

The invention will be explained in more detail below with reference to a preferred exemplary embodiment. In the figures:

FIG. 1 shows a schematically illustrated cross-sectional view of a preferred embodiment of the invention, both in the uninstalled and in the completely installed state, FIGS. 2a and 2b each show a schematically illustrated cross-sectional view of a preferred embodiment of the invention in the installed state given different material thicknesses of the installation hole, FIGS. 3a and 3b each show a schematically illustrated cross-sectional view of a preferred embodiment of the invention in the installed state both with and without a cable to be passed through, FIGS. 4a and 4b each show a schematically illustrated cross-sectional view of a further preferred embodiment of the invention as an EMC-proof shield in the installed state both with and without a cable to be passed through, FIGS. 5a, 5b and 5c each show a schematically illustrated cross-sectional view of a preferred embodiment of the invention in the installed state with the cable to be passed through given different cable diameters, FIGS. 6a, 6b and 6c each show a schematically illustrated cross-sectional view of different sizes of a preferred embodiment of the invention in the uninstalled state, and FIG. 7 shows a possible variant for application of the invention for further use of separated-off pieces of the apparatus for universal cable bushing.

DETAILED DESCRIPTION

FIG. 1 illustrates schematically a cross-sectional view of a preferred embodiment of an apparatus according to the invention for universal cable bushing, once in the uninstalled state and then in the completely installed state. The basic shape of the apparatus according to the invention illustrated in this case comprises a cable bushing element 1, which can be used universally firstly for different cable diameter ranges and secondly for different diameter ranges of a hole 24 and material thicknesses of a wall 25, into which the cable bushing element 1 can be introduced for installation purposes. The cable bushing element 1 is designed to accommodate a cable 30 (cf. FIG. 3b) made from an elastic base material. It has on its inner side 4 a plurality of lamellae 11, which are arranged in stepped fashion and some of which act as sealing lips and are suitable for surrounding and fixing a cable 30 to be passed through. The lamellae 11 which are arranged in stepped fashion on the inner side 4 in this case are arranged one behind the other coaxially around the center axis 7 of the cable bushing element 1, and the inner diameter of the lamellae 11 arranged in stepped fashion tapers increasingly in the axial direction. The individual lamellae 11 in this case each have a triangular cross section and are each spaced apart from one another such that, together, they form an interrupted saw-tooth profile in the axial direction of the cable bushing element 1, said saw-tooth profile having spacings between the individual profile teeth which are each wider than each individual tooth itself. Furthermore, the cable bushing element 1 has on its outer side 3 a plurality of lamellae 19 which are arranged in the form of a fir tree. The lamellae 19 which are arranged in the form of a fir tree on the outer side 3 are in this case likewise arranged one behind the other coaxially around the center axis 7 of the cable bushing element 1, and the outer diameter of the lamellae 19 tapers increasingly in the axial direction such that the outer profile of the cable bushing element 1 is similar to the outline of a stylized fir tree. The individual lamellae 19 in this case each have a triangular cross section and together form a saw-tooth profile in the axial direction of the cable bushing element 1. Owing to the different diameters of the lamellae 11, 19, which are arranged in stepped fashion on the inner side 4 or in the form of a fir tree on the outer side 3 of the cable bushing element 1, it is possible to use a single cable bushing element 1 according to the invention universally for a broad range of different cable diameters or installation hole diameters whilst ensuring all the functionalities of a conventional diameter-specific cable bushing apparatus. In addition, the arrangement of the lamellae 19 in the form of a fir tree on the outer side 3 of the cable bushing element 1 within a region which is defined by the shape of the lamellae 19 makes it possible to match the cable bushing element 1 to different material thicknesses of a hole 24, into which the cable bushing element 1 can be or is introduced for installation purposes. The cable bushing element 1 is of integral design and is designed to be rotationally symmetrical and partially in the form of a truncated cone. In this case, it is composed of a part 5 in the form of a truncated cone and an annular part 6. Both the cavity 2 on the inner side 4 and the outer contour of the cable bushing element 1 are in this case designed to be partially in the form of a truncated cone such that the cable bushing element 1 now has an almost constant basic thickness of its wall 8 (i.e. without taking into account the lamellae 11, 19 arranged on the inside and outside of the wall 8) in these regions in the form of truncated cones. The annular part 6 is in this case partially in the form of a flange, which protrudes in the radial direction beyond the wall 8 in the part 5 in the form of a truncated cone of the cable bushing element 1. The outer diameter of the part 5 in the form of a truncated cone tapers with increasing distance from the annular part 6 of the cable bushing element 1. Owing to the design which is partially in the form of a truncated cone and the constant basic thickness of its wall 8 in its part 5 which is in the form of a truncated cone, the cable bushing element 1 can be elastically deformed in a very simple manner and is thus suitable for accommodating different cable diameters. The cable bushing element 1 also has a membrane 10 which is closed in the initial state. It is possible to pass through this membrane, for example during installation of a cable 30 to be passed through (cf. FIG. 3b), with the aid of a screwdriver or else by means of the cable 30 to be passed through itself. The membrane 10 in this case serves the purpose of preventing the ingress of moisture or dirt into the cable bushing as long as no cable 30 is passed through.

FIGS. 2a and 2b each show schematically a cross-sectional view of the same preferred embodiment of an apparatus according to the invention for universal cable bushing in the installed state, as in FIG. 1, but with different material thicknesses for the wall 25a and 25b of the hole 24 (cf. FIG. 1), into which the cable bushing element 1 is in each case introduced for installation purposes. In this case, it can be seen, in particular, that it is possible to match the lamellae 19 which are arranged in the form of a fir tree on the outer side 3 of the cable bushing element 1 to different material thicknesses of the installation hole within a defined range which depends on the outer shape of the lamellae 19. In this case, FIG. 2a shows the apparatus according to the invention installed in a wall 25a having a thinner material, whereas FIG. 2b shows the same apparatus installed in a wall 25b having a thicker material.

FIGS. 3a and 3b each show schematically a cross-sectional view of the same preferred embodiment of an apparatus according to the invention for universal cable bushing in the installed state as in FIG. 1 and FIG. 2, both without and with a completely installed cable 30 to be passed through. In particular in FIG. 3b, in which the apparatus according to the invention is illustrated with the cable 30 to be passed through in the completely installed position, it can be seen that the cable bushing element 1 has on its inner side 4 the lamellae 11 which are arranged in stepped fashion and of which one first lamella 12 and one second lamella 14 each surround and fix the cable 30 to be passed through. In addition, it can be seen that the length and the inner diameter range of the cable bushing element 1 have been matched to the diameter of the cable 30 to be passed through by separating off subregions which are not required. In this case, some of the cable bushing element 1 (not illustrated completely in FIG. 3a), which has a smaller inner diameter than the outer diameter of the cable 30 to be passed through, has been separated off with the aid of a tool, for example a knife, to such an extent that at least one of the lamellae 11, which are arranged in stepped fashion on the inner side 4 of the cable bushing element 1, having an inner diameter which corresponds to the cable 30 to be passed through is still present which then tightly surrounds the cable 30 for fixing and sealing purposes at its outer sleeve owing to the elastic properties of the lamellae 11. FIG. 3a illustrates the part of the cable bushing element 1 which is to be separated off for this purpose above the stylized section line 17.

FIGS. 4a and 4b each show schematically a cross-sectional view of a further preferred embodiment of the apparatus according to the invention for universal cable bushing as an EMC-proof shield in the installed state both with and without a cable 30 to be passed through. In this case, the cable bushing element 1 has electrically conductive properties, as a result of which the cable bushing element 1, in addition to its elastic properties for accommodating and fixing the cable 30 to be passed through, is thus capable of serving as an EMC-proof shield itself without shielding elements additionally needing to be provided. In order to provide the cable bushing element 1 itself with electrical conductivity, the elastic base material, from which the cable bushing element 1 is manufactured, for example of the silicone rubber type VMQ, is preferably doped with particles of an electrically conductive additional material, for example nickel graphite, as a filler. In this case, it can be seen in FIG. 4b that the cable bushing element 1 has on its inner side 4 a first and a second lamella 12, 14 which are arranged in stepped fashion and which each surround and fix the completely installed cable 30 to be passed through, the first lamella 12 also making contact with a cable shield 35 of the cable to be passed through. This makes it possible for the insulation 34 of the cable 30 to be removed at a contact point 32 between the cable 30 to be passed through and the first lamella 12, and for the contact point 32 to then be exposed as far as the cable shield 35 such that the first lamella 12 engages fixedly around the exposed contact point 32 owing to its elastic properties and is in contact with the cable shield 35. The second lamella 14, which is arranged in stepped fashion with respect to the first lamella 12 and has a slightly larger inner diameter than the first lamella 12, is in contact with the outer sleeve of the cable 30 and tightly surrounds the cable 30 owing to its elastic properties in order to fix and to seal it at its outer sleeve. In this case, both the first lamella 12 and the second lamella 14 serve the purpose of preventing moisture and/or dirt from passing via the outer sleeve of the cable 30 to be passed through from one side of the first lamella 12 and/or the second lamella 14 to the other. This makes it possible to produce an electrical connection between the shield 35 of the cable 30, for example, and a housing, to which the wall 25 belongs and in which the cable bushing is fitted, via the electrically conductive cable bushing element 1, as a result of which the shield 35 of the cable 30 can be grounded. For this purpose, the cable bushing element 1 is electrically and mechanically connected to a grounded contact area 22, which is, for example, part of a switchgear cabinet housing (not shown) in which the cable bushing is fitted, by means of the lamellae 19 which are arranged in the form of a fir tree on the outer side 3 of the cable bushing element 1. The contact area 22 is in this case the edge of the hole 24 (cf. FIG. 1) in the wall 25 of the housing, the edge of the hole 24 being metallic. Here too, the length and the inner diameter range of the cable bushing element 1 have been matched to the diameter of the cable 30 to be passed through by separating off a subregion which is not required by a part, which is above the stylized section line 17, of the cable bushing element 1 (illustrated completely in FIG. 4a), which has a smaller inner diameter than the outer diameter of the cable 30 to be passed through, having been separated off to such an extent that three of the lamellae 11, which are arranged in stepped fashion on the inner side 4 of the cable bushing element 1, having an inner diameter which corresponds to the cable 30 to be passed through are still provided which then tightly surround the cable 30 for fixing and sealing purposes at its outer sleeve and for the purpose of making contact with the partially exposed cable shield 35 owing to the elastic properties of the lamellae 11.

FIGS. 5a, 5b and 5c each show schematically a cross-sectional view of a preferred embodiment of the apparatus according to the invention for universal cable bushing in the installed state with different cables 30a, 30b, 30c to be passed through which each have a different cable diameter. In this case, the length and the inner diameter range of the cable bushing element 1 are in each case matched to the diameter of the respective cable 30a, 30b, 30c to be passed through by separating off the respective subregion which is not required. In this case, some of the cable bushing element 1, which has a smaller inner diameter than the respective outer diameter of the cable 30a, 30b, 30c to be passed through, has in each case been separated off to such an extent that at least one of the lamellae 11, which are arranged in stepped fashion on the inner side 4 of the cable bushing element 1, having an inner diameter which in each case corresponds to the cable 30a, 30b, 30c to be passed through is still provided which then can tightly surround the respective cable 30a, 30b, 30c for fixing and sealing purposes at its outer sleeve. The separated-off region of the cable bushing element 1 is in this case longer and larger the thicker the respective cable 30a, 30b, 30c to be passed through or the larger its diameter. This means that the part of the cable bushing element 1 which remains for the purpose of installing the respective cable 30a, 30b, 30c in the wall 25 is in this case shorter and smaller the larger the diameter of the respective cable 30a, 30b, 30c to be passed through.

FIGS. 6a, 6b and 6c each show schematically a cross-sectional view of different sizes of a preferred embodiment of the apparatus according to the invention for universal cable bushing in the uninstalled state. Although, in the ideal case, only one universal type of a cable bushing element 1 according to the invention is sufficient to cover the conventional application sectors as regards the cable diameter and the installation hole diameter and the installation hole wall thickness, for the case in which the use of only one type cannot cover the breadth of the intended use, a plurality of universal cable bushing elements 1a, 1b, 1c having different sizes is available (as illustrated in FIGS. 6a, 6b and 6c) which all have the same design and the same geometry but serve different diameter spectra.

FIG. 7 shows a possible variant for the application of the apparatus according to the invention for universal cable bushing in particular for further use of separated-off pieces of the cable bushing element 1. In this case, the cable bushing element 1 has been divided into three pieces 15a, 15b, 15c, for example, for the purpose of matching it to different cable diameters or different installation hole diameters along section lines 17a, 17b. In this case, it can be seen, in particular, that the length and the outer diameter range of the cable bushing element 1 can be matched to the diameter of a respective hole 24a, 24b, 24c into which the cable bushing element 1 is intended to be introduced for installation purposes, by separating off subregions which are not required. In this case, two pieces 15a, 15b, which each have a larger outer diameter than the hole 24c for the cable bushing in the wall 25, have been separated off, for example for a hole 24c, from a cable bushing element 1, to such an extent that at least one of the lamellae 19, which are arranged in the form of a fir tree on the outer side of the piece 15c of the cable bushing element 1, having an outer diameter which corresponds to the diameter of the hole 24c is still provided which then engages with the edge of the hole 24c so as to form a groove-like contour, for the purpose of fixing the piece 15c of the cable bushing element 1 in a final installed position and for the purpose of sealing the cable bushing. The separated-off pieces 15b, 15c can in this case be further used without any problems for further different cable diameters or diameters of holes 24a, 24b, into which the pieces 15a, 15b of the cable bushing element 1 are intended to be introduced for installation purposes, as a result of which costs, waste and the impact on the environment are reduced.

LIST OF REFERENCES

1, 1a, 1b, 1c Cable bushing element
2 Cavity
3 Outer side
4 Inner side
5 Part in the form of a truncated cone
6 Annular part
7 Center axis
8 Wall
10 Membrane
11 Lamellae arranged in stepped fashion
12 First lamella
14 Second lamella
15a, 15b, 15c Pieces
17, 17a, 17b Section line
19 Lamellae arranged in the form of a fir tree
22 Contact area
24, 24a, 24b, 24c Hole
25, 25a, 25b Wall
30, 30a, 30b, 30c Cable
32 Contact point
34 Insulation
35 Cable shield

The invention claimed is:

1. An apparatus for universal cable bushing, comprising:
a cable bushing element which is designed to accommodate at least one cable to be passed through an interior of the cable bushing element, the cable bushing element being made of at least one elastic base material,
wherein the cable bushing element has on an inner side a plurality of inner lamellae which are arranged in stepped fashion, wherein at least a first of the inner lamellae and a second of the inner lamellae are configured to cooperate to surround and fix the cable when the cable is passed through the interior of the cable bushing element; and
wherein the cable bushing element has on an outer side a plurality of outer lamellae, wherein at least one of the outer lamellae secures the cable bushing element within a hole defined in a surface.

2. The apparatus as claimed in claim 1, wherein the cable bushing element is of integral design.

3. The apparatus as claimed in claim 1, wherein the cable bushing element is designed to be at least partially rotationally symmetrical.

4. The apparatus as claimed in claim 1, wherein the cable bushing element is designed to be at least partially conical or in the form of a truncated cone.

5. The apparatus as claimed in claim 1, wherein the cable bushing element has at least one membrane which is closed in an initial state.

6. The apparatus as claimed in claim 1, wherein a length and an inner diameter range of the cable bushing element can be matched to a diameter of the cable by separating off subregions of the cable bushing element that are not required.

7. The apparatus as claimed in claim 1, wherein a length and an outer diameter range of the cable bushing element can be matched to a diameter of the hole of the surface into which the cable bushing element is to be secured by separating off subregions of the cable bushing element that are not required.

8. The apparatus as claimed in claim 1, wherein the cable bushing element has electrically conductive properties.

9. The apparatus as claimed in claim 8, wherein at least one electrically conductive additional material is introduced into the elastic base material, as a result of which the cable bushing element has electrically conductive properties.

10. The apparatus as claimed in claim 8, wherein at least one of the inner lamellae is suitable for making contact with a shield of the cable.

11. The apparatus as claimed in claim 10, wherein the second inner lamella is suitable for making contact with an outer sleeve of the cable.

12. The apparatus as claimed claim 1, wherein the outer lamellae are arranged so as to form a saw-tooth profile.

13. The apparatus as claimed claim 1, wherein the inner lamellae are arranged so as to form an interrupted saw-tooth profile.

14. A method for universal cable bushing, comprising:
providing a cable bushing element defining an interior surface and an exterior surface, the interior surface defining an inner diameter range, the exterior surface defining an outer diameter range, wherein the interior surface includes at least three inner lamellae which are arranged in stepped fashion and the exterior surface includes a plurality of outer lamellae which are arranged in stepped fashion;

inserting a cable through the cable bushing element so that at least two of the inner lamellae cooperate to fix the cable within the cable bushing element, the cable having a diameter;

separating off at least one subregion of the cable bushing element to modify the inner diameter range of the cable bushing element to match the diameter of the cable;

introducing the cable bushing element into a hole defined in a surface so that at least one of the outer lamellae fixes the cable bushing element to the surface, the hole having a diameter; and separating off at least one subregion of the cable bushing element to modify the outer diameter range of the cable bushing element to match the diameter of the hole of the surface.

15. The method of claim 14, wherein separating off the at least one subregion of the cable bushing element is implemented prior to insertion of the cable through the cable bushing element.

16. The method of claim 14, wherein separating off the at least one subregion of the cable bushing element is implemented during insertion of the cable through the cable bushing element.

17. The method of claim 14, wherein separating off the at least one subregion of the cable bushing element is implemented following insertion of the cable through the cable bushing element.

18. An apparatus for universal cable bushing, comprising:
a cable bushing element which is designed to accommodate at least one cable to be passed through an interior of the cable bushing element, the cable bushing element having an interior surface and an exterior surface;
a plurality of inner lamellae arranged in stepped fashion on the interior surface; and
a plurality of outer lamellae arranged on an exterior surface to form a saw-tooth profile in an axial direction of the cable bushing element, wherein two of the outer lamellae cooperate to secure the cable bushing element within an opening defined in a surface.

19. The apparatus as claimed in claim 18, wherein the inner and outer lamellae are formed integrally with the cable bushing element.

* * * * *